W. MURCHEY.
DEVICE FOR CUTTING SCREW THREADS.
APPLICATION FILED AUG. 26, 1912.
1,114,629.
Patented Oct. 20, 1914.
3 SHEETS—SHEET 3.
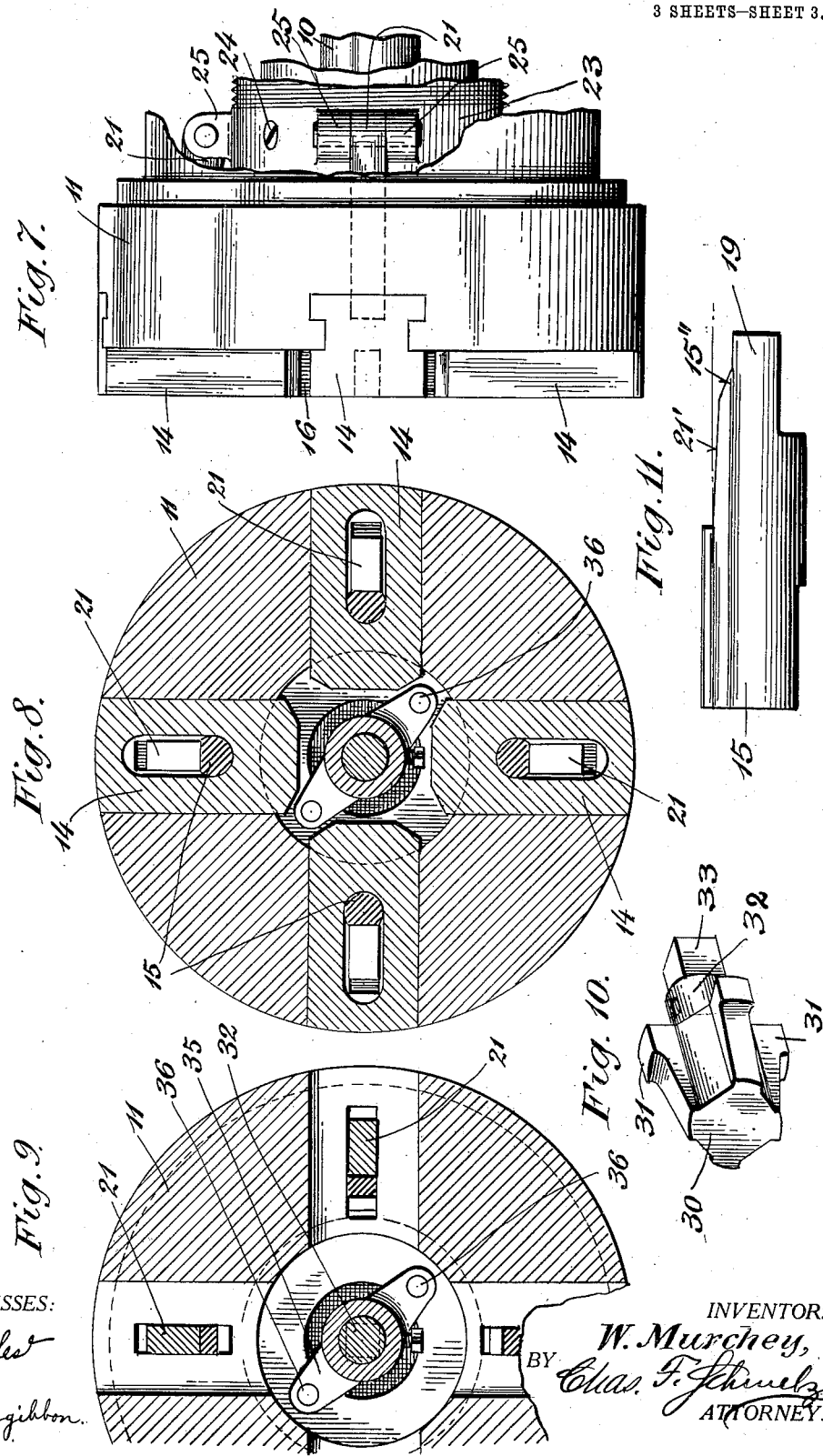

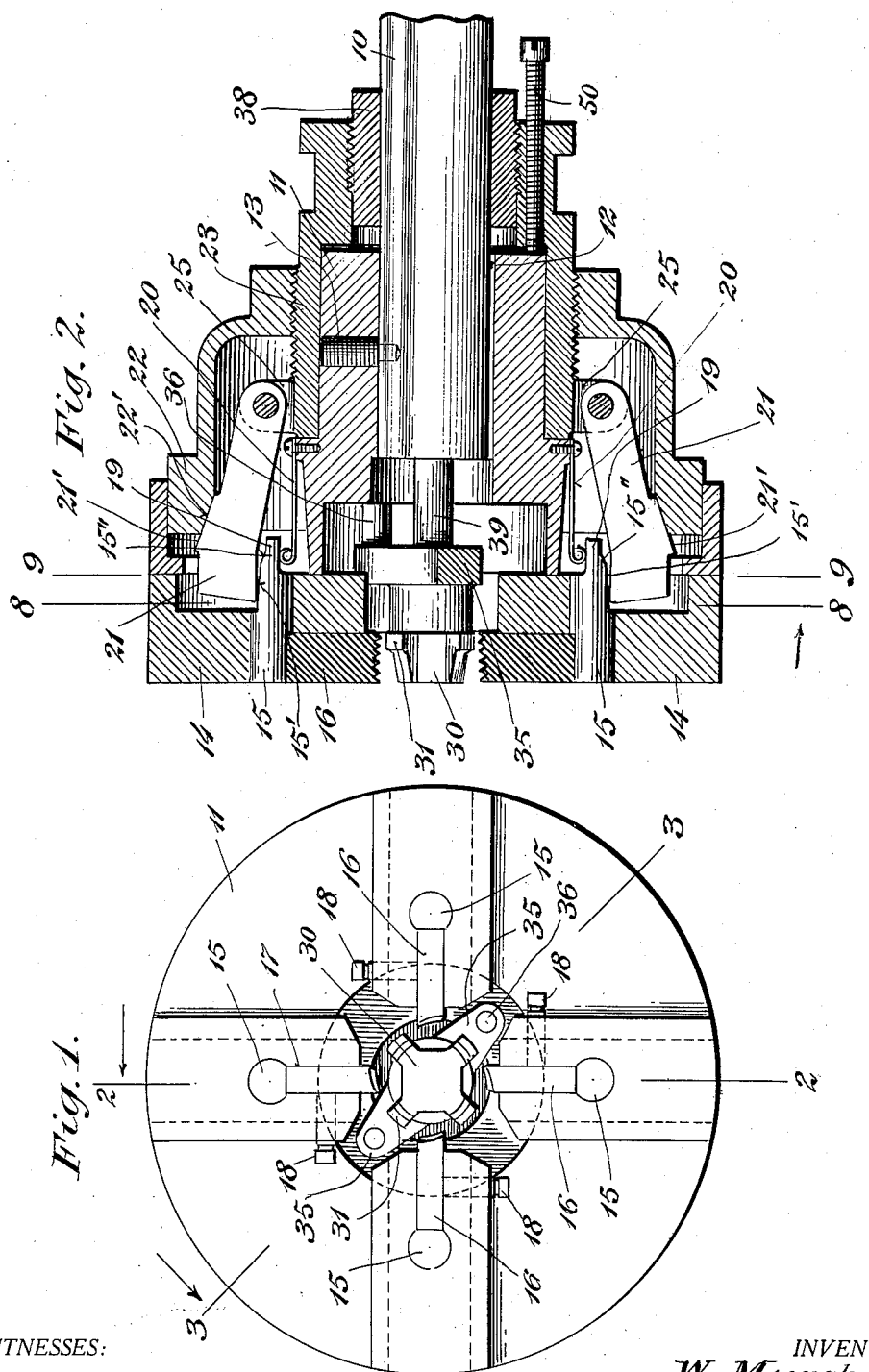

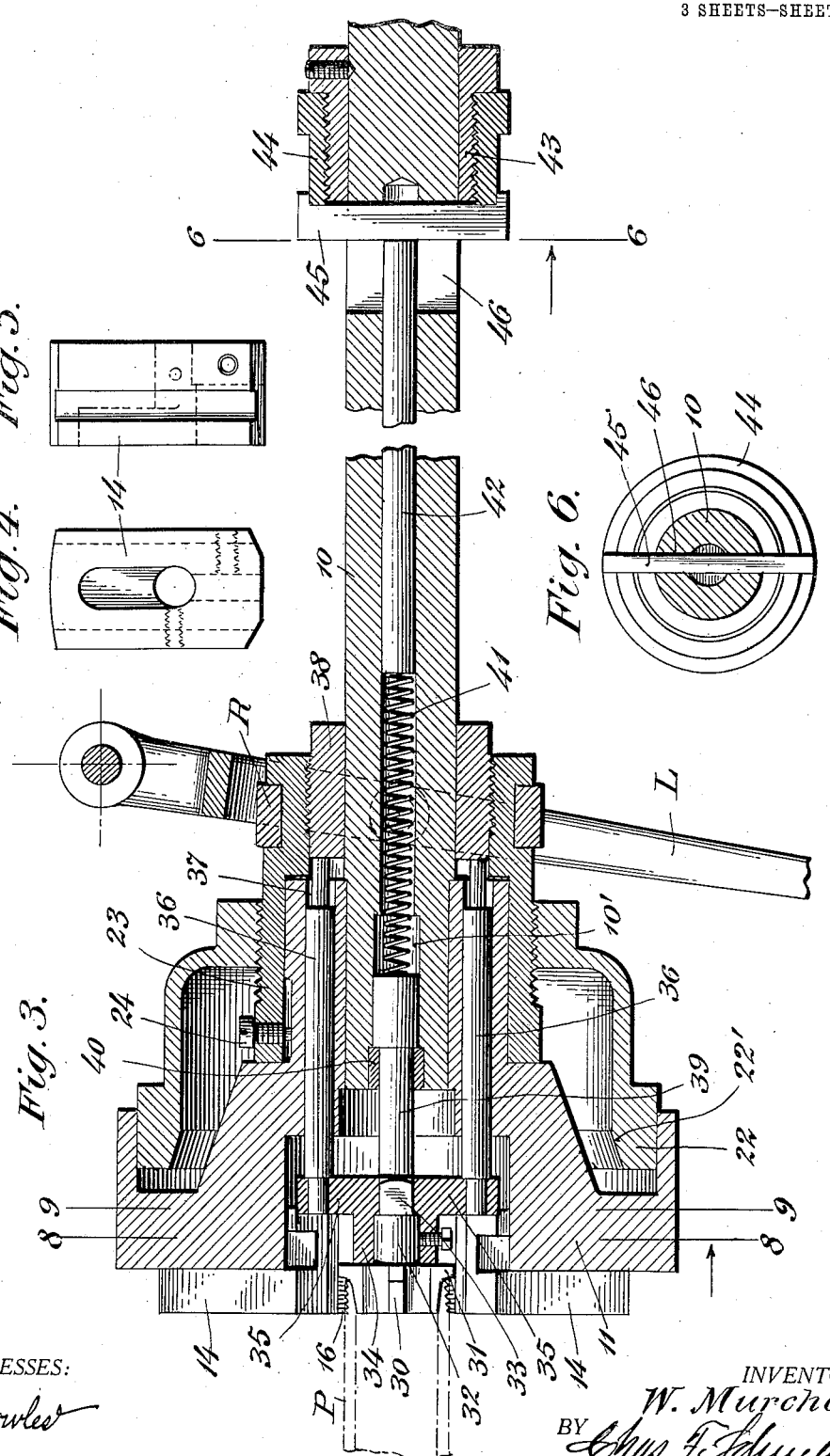

UNITED STATES PATENT OFFICE.

WILLIAM MURCHEY, OF DETROIT, MICHIGAN, ASSIGNOR TO WALTER H. JENNINGS AND CORNELIUS K. CHAPIN, OF DETROIT, MICHIGAN.

DEVICE FOR CUTTING SCREW-THREADS.

1,114,629.  Specification of Letters Patent.  Patented Oct. 20, 1914.

Application filed August 26, 1912. Serial No. 716,954.

*To all whom it may concern:*

Be it known that I, WILLIAM MURCHEY, a citizen of the United States, residing at Detroit, in the county of Wayne and State of Michigan, have invented certain new and useful Improvements in Devices for Cutting Screw-Threads, of which the following is a specification.

This invention relates to devices for cutting screw-threads exteriorly of the work, and more particularly to that class thereof especially adapted for threading pipes and the like, and it has for one of its objects the provision of an improved die-head adapted to cut a taper thread and to open the chasers gradually as they progress longitudinally of the work.

The invention has further for its object the provision of means whereby the chasers will be automatically opened or entirely released from the work after a certain length of thread has been cut.

A further object of the invention resides in the provision of means whereby the length of thread to be cut may be varied within reasonable limits without interfering with the gradual opening movement of the chasers during the cutting operation.

The invention has also for its object the provision of a reamer whereby the inside of the pipe end to be externally threaded, may be reamed out, this reamer constituting one of the elements whereby the entire chaser-relieving mechanism is controlled.

Further objects of the invention will hereinafter appear and be particularly defined in the claims.

The invention has been clearly illustrated in the accompanying drawings, in which similar characters denote similar parts, and in which—

Figure 1 is a front view of a die-head embodying my invention. Fig. 2 is a central longitudinal section thereof, on line 2, 2 of Fig. 1. Fig. 3 represents a similar section of the head and its spindle, on line 3, 3 of Fig. 1, the supports or bearings for the spindle being omitted. Fig. 4 shows a rear view of one of the chaser-carriers or sliding blocks. Fig. 5 is a side view thereof. Fig. 6 illustrates a cross-section of the spindle, on line 6, 6 of Fig. 3. Fig. 7 shows a side view of the chaser-carrying end of the head.
Fig. 8 represents a section of the head, on line 8, 8 of Figs. 2 and 3. Fig. 9 is a section on line 9, 9 of Figs. 2 and 3. Fig. 10 is a perspective view of the reamer employed in my device. Fig. 11 is a side view of the slide-pin, on an enlarged scale.

Briefly stated, my improved die-head is particularly adapted for use in connection with a power-driven nipple and pipe threading machine in which the head-spindle is rotatable but non-shiftable longitudinally. The head carries a number of thread-cutting chasers which are normally closed-in to cut a thread exteriorly on a pipe, this cutting operation beginning with the smallest thread-diameter. As the work is gradually drawn inward by the pitch of the thread-cutters, the latter are gradually opened to produce the required "standard pipe thread taper" which is generally accepted as one-sixteenth of an inch per one inch thread-length. When the desired thread-length has been cut, the chasers will be automatically thrown outward and clear of the work, and it then requires hand-manipulation to bring them together again into their closed-in position. A reamer for the inside and the end-face of the pipe is also operative simultaneously with the thread-cutting operation, and by its movement longitudinally with the pipe, the chaser-relieving mechanism is operated.

Referring now to the drawings, 10 denotes the head-carrying spindle upon which the head 11 is firmly secured by a key 12 and also a set-screw 13 (see Fig. 2). Mounted and guided for radial movement in the face of the head 11, are a series of chaser-carrying slides 14 which are provided with abutment-members shown herein as pins 15, against the inner faces of which the chasers or thread-cutting tools 16 rest. The latter are fitted in slots 17 and held against displacement by set-screws 18. The rear ends of each pin 15 is provided with an extension 19 the under-side of which is engaged by a blade-spring 20, the latter being secured to the hub-portion of the head 11, so that each spring tends to push its particular slide 14 radially outward to open the die-chasers. Means are provided for variably limiting or controlling this radially-outward movement of all the carriers 14 simultaneously, these means consisting substantially of what may be termed "die-levers" 21, engaging the upper or outer faces of the several pins 15 respectively, and each having an inclined face 21' which is in contact with the beveled face 22' of an annular regulating member or ring 22. The hub of this ring is rotatable on, and in screw-threaded engagement with a sleeve 23 which is slidable longitudinally but non-rotatably mounted on the hub of the head 11, as for instance by a screw-pin-and-slot connection 24 (see Fig. 3), and which is provided with pairs of ears 25 between which the die-levers 21 above referred to are pivoted.

From the foregoing it will be understood that, under normal conditions (when the sleeve 23 is stationary and in the position shown in Fig. 2), a manual rotation of the ring 22 will result in either forcing the free ends of the die-levers 21 toward the axis of the carrier, or it will withdraw its beveled face 22' in a rearward direction and thus allow the springs 20 to move all the carriers 14 outwardly; all in accordance with the direction of such rotation. It is, therefore, evident that in this manner the thread-diameter of the chaser-cut may be varied within the limits of the incline and movement of the beveled face 22' of said ring. In Fig. 2 the position of the ring 22 is substantially at its extreme right or rearward adjustment, so that therefore the chaser-slides are open for the largest diameter of pipe to be threaded. If the pipe should be smaller, the ring need only be screwed farther onto the sleeve toward the front of the head, when the chaser slides will be correspondingly contracted, and consequently a smaller thread-diameter will be cut.

As above stated, the present device is also organized in such a manner that the chasers will be gradually moved radially outward to correspond with the standard taper of the desired screw-thread, and in this instance I rely entirely upon the longitudinal movement of the pipe into the head to perform this function in an automatic manner. Furthermore the chasers are preferably formed with their cutting teeth corresponding to this taper, although a "straight" cutting face may be employed. It being remembered that the pipe is gradually drawn into the head through the screw-cutting action of the chasers, it follows that if the chaser-slides were held fixed in their once adjusted positions, the pipe thread would be tapered only at the front end and for a length equal to the thickness of the chasers, while the rear portion of the thread, from the back-face of the chasers to the rear end of the pipe, would of course be straight cylindrical and equal to the smallest diameter of the chasers. Now, in order to avoid this objectionable feature, the chasers, or rather their carriers 14 are so organized that they will be gradually moved outward and thus produce a tapered thread regardless of how thick or how thin the chasers may be. This outward movement being such as to correspond to the standard taper generally adopted for pipe-threads.

By referring to Figs. 2 and 11, it will be noted that the outer face 15' of the pin 15 is thus inclined, so that when the sleeve 23 is, in some way or other, moved rearwardly, the nose of each die lever will slide along this inclined face 15' and therefore permit the spring 20 to assist in moving the chaser-slide outward, radially, in addition to the tendency which the cutting action of the chasers naturally has to perform this function. This, then, means that the chasers will cut a continuously tapering thread as long as the lever nose rides on the pin-face 15', and until it has reached the "drop-off" point 15" which allows a sudden outward movement of the slide 14 sufficiently to completely disengage the chasers from the work. From this it can be very readily understood that the actual length of the pipe thread to be cut depends entirely upon the length of travel of the lever-nose to the "drop-off" point 15", and also that the number of cutting teeth longitudinally axially of the chasers does not in the least have any influence upon the length of the pipe thread. In fact, two or three tooth-convolutions will suffice to form a perfect pipe thread of a length equal to that of the incline or taper-face 15'; but I prefer to provide a greater number of such convolutions because, when the actually-cutting front teeth become worn, the chaser-slides may be adjusted by the ring 22 to bring the succeeding teeth into operation, it being understood that the collar 38 should be adjusted correspondingly to maintain that same particular length of thread. Hence it is evident that the "life" of the chasers, as such, is very materially lengthened. In connection with the outward movement of the chaser-slides, it may also be mentioned that, even with the teeth formed on a taper as described, the last teeth will never cut the work to the same extent as the first or front teeth, for the reason that the taper of the chasers corresponds exactly to the inclined face 15'.

While different methods may be readily devised to move the sleeve 23 rearward at the same ratio at which the pipe enters the head 11, I prefer to let the pipe, itself, perform this work, and I accomplish the desired result by a reamer whereby the inside of the pipe-end is reamed out smooth and its end face is machined or "squared" to produce finished work. The reamer is herein designated by the numeral 30, and it has a flange 31 against which the end of the pipe P (see Fig. 3) will be drawn by the thread-cutting action of the chasers, it being understood that the reamer has at that time finished its work on the pipe-end.

As, then, the pipe continues being drawn into the head, it will move the reamer rearward and thus cause a rearward movement of the sleeve 23, as follows: The reamer 30 has a shank 32 provided with a squared end 33 which is fitted in a corresponding recess in a holder 34. The latter has side extensions 35 in which are respectively mounted a pair of push-rods 36 which are guided in apertures 37 provided for that purpose in the hub of the head 11. The rear ends of the rods 36 are adapted to rest against the front face of a collar 38 which is free to rotate and slide longitudinally on the spindle 10, and is in screw-threaded engagement with the rear end of the non-rotatable sleeve 23, so that, by rotating the collar 38, the reamer may be variably positioned relatively to the head 11 and its chaser-slides 14, when the sleeve 23 is in its normal position shown. When the machine is idle, or rather until the reamer is forced bodily rearward, the latter is maintained in its forward position by a plunger 39 slidably mounted in the central bore 10' of the spindle 10, and also in a bushing 40 whereby the outward movement of the plunger is limited, as against a spring 41 interposed between said plunger and an abutment-rod 42. In order to enable the operator to vary the resistance of the spring 41, the spindle 10 has a fixed collar 43 upon which a sleeve 44 is adjustably mounted to serve as a rest for a bar 45 passing through a slot 46 in the spindle 10 and, in turn, serving as a stop or abutment for the rear end of the rod 42. In recapitulation, the operation is briefly as follows:—The parts of the die-head being normally in the position shown, the pipe P is brought into contact with the chasers. As the head rotates, the pipe will be gradually drawn toward and into the head, bringing the pipe end into engagement with the reamer until the end-face will bring up against the reamer flange and thereupon move the reamer bodily rearward against the spring 41 and moving the collar 38 longitudinally in unison with the pipe, rearwardly. This movement of the collar 38 results in drawing the sleeve 23, with its ring 22 and the die-levers, rearward so that the chaser slides may then move gradually outward and form a perfect standard-taper pipe-thread until the point 15" has been reached and the chasers become released. If the pipe should be slightly "under-size," the ring 22 can be moved forward to bring the front chaser-teeth into the proper diameter, without interfering with the point of engagement between the die-levers 21 and the slide-pins 15. The length of pipe-thread may be varied by either substituting pins having longer or shorter inclines for those shown at 15', or by changing the relative positions between the slide-collar 38 and the sleeve 23, or by substituting different-length push rods for those shown at 36, but the preferred way or manner of producing the desired result is illustrated in detail in Fig. 2. It being remembered that the chaser-carriers or slides 14 do not move longitudinally of the axis of the head, it follows that the pins 15 will always remain in the same position longitudinally of this axis. This includes of course the inclined face 15' and the drop-off point 15". Now inasmuch as the length of the thread is controlled by the distance which the levers 21 travel from their starting point (see Fig. 2) to the drop-off point, it follows that if this travel is by any means shortened or reduced, the length of the thread may be varied in accordance with such change. Therefore I accomplish this result by moving the sleeve 23 longitudinally of the head-axis so as to bring the working nose of each lever 21 to the proper distance from the drop-off point 15" in such a manner that the front teeth of the chasers, when worn, may be entirely disregarded. In order to make this matter clear let us suppose that the position of the reamer shown in Fig. 2 is exactly right for the front teeth of the chasers to produce the required thread-length. Then after these working teeth (say about one-quarter of an inch chaser thread-length) has been worn to that extent or perhaps removed and ground off entirely, it is evident that compensation must be made for this one-quarter of an inch lack of teeth, when it is desired to cut the pipe threads as before. Hence it becomes necessary to change the position of the sleeve 23 relative to the head so that then the pipe entering thereinto will not commence to move the sleeve 23 rearward by pushing against the reamer 30, until the active chaser teeth shall commence to operate on the outside of the pipe. In order to do this, I have provided an adjusting screw 50 in screw-threaded engagement with the rear portion of the sleeve 23 and abutting against the rear face of the hub 11. Whenever any amount of linear distance of chaser teeth is ground away, the sleeve 23 should be pulled rearward for this same amount or distance by adjusting the screw 50, so that when then the pipe engages the reamer 30, the latter will be simply pushed rearwardly against the action of the spring 41 without however disturbing the sleeve 23 or the adjustment collar 38, the relative position remaining as before.

Any convenient means may be employed to bring the parts to normal, the machines of this character being usually equipped with a hand operable lever L in engagement with a split ring R fitted in a groove in the sleeve 23 above mentioned.

Many changes may be made in the particular construction and general organization of several of the elements of my improved device, without departing from the spirit of the invention as defined by the claims.

I claim:—

1. The combination with a head, slides movable radially thereon, and chasers carried by said slides, of a series of levers each having an outer inclined face and pivoted on the head for controlling the outward movement of said slides, and a device engaging all of said inclined faces for variably positioning said levers to adapt the chasers for work of different diameters.

2. The combination with a head, slides movable radially thereon, and chasers carried by said slides, of a series of levers pivotally mounted on said head and engaging said slides to control the outward movement thereof, and a beveled ring movable relatively to and engaging said levers for varying the normal position thereof to adapt the chasers for work of different diameters.

3. The combination with a head, chasers radially movable thereon, and a tapered member carried by each chaser, of a series of devices engaging said tapered members for controlling the outward movement of the chasers at a certain ratio relative to the advance movement of the work through the chasers during the cutting operation, a member pivotally connected with and for moving said devices in unison with and by the advance movement of the work, and means for variably positioning said devices radially of the head for adjusting the normal opening between the chasers for different sizes of work.

4. The combination with a head, chasers radially movable thereon, and a tapered member carried by each chaser, of a series of levers engaging said tapered members extraneously thereof for controlling the outward movement of the chasers at a certain ratio relative to the advance movement of the work through the chasers during the cutting operation, a member pivotally connected with and for moving said levers over the working faces of said tapered members, and a member slidable longitudinally of the head and levers for variably positioning the latter to different openings between the chasers, whereby the latter may be positioned for work of different diameters.

5. The combination with a head, a series of slides guided for radial movement thereon, chasers carried by said slides respectively, and a member on each slide having an inclined face corresponding to the taper of the thread to be cut, of a series of levers and in engagement with the inclined faces of said tapered members, a member carrying said levers for radially swinging movement and for moving said levers longitudinally of the head and along said inclined faces, and means for positioning said levers radially to vary the position of said slides and the chasers carried thereby, to adapt the latter for different sizes of work.

6. The combination with a head, slides radially movable thereon, chasers carried by said slides respectively, and members carried by said slides having inclined faces, of a sleeve longitudinally movable relatively to the head, a series of levers pivoted for radial movement on said sleeve and engaging the inclined faces of said slide members respectively, and means controlled by the advance movement of the work through the chasers, to move said sleeve with said levers longitudinally of the head to maintain the outward movement of said slides in a predetermined ratio relative to the advance movement of the work and to correspond to the taper of the thread to be cut.

7. The combination with a head, slides radially movable thereon, chasers carried by said slides respectively, and members carried by said slides having inclined faces, of a sleeve longitudinally movable relatively to the head, a series of levers pivoted for radial movement on said sleeve and engaging the inclined faces of said slide-members respectively, means controlled by the advance movement of the work through the chasers, to move said sleeve with said levers longitudinally of the head to maintain the outward movement of said slides in a predetermined ratio relative to the advance movement of the work and to correspond to the taper of the thread to be cut, and means for varying the time of the commencement of sliding movement of said sleeve.

8. The combination with a head, slides radially movable thereon, chasers carried by said slides respectively, and members carried by said slides having inclined faces, of a sleeve longitudinally movable relatively to the head, a series of levers pivoted for radial movement on said sleeve and engaging the inclined faces of said slide-members respectively, means controlled by the advance movement of the work through the chasers, to move said sleeve with said levers longitudinally of the head to maintain the outward movement of said slides in a predetermined ratio relative to the advance movement of the work and to correspond to the taper of the thread to be cut, and a collar adjustably mounted in said sleeve and adapted to be moved longitudinally by the advance movement of the work, whereby the time of starting said sleeve movement may be varied.

9. The combination with a head, slides radially movable thereon, chasers carried by said slides respectively, and members projecting from said slides and having inclined faces, of a sleeve mounted for longitudinal movement relative to the head, a series of levers pivoted on said sleeve for radial movement and engaging the inclined faces of said slide-members respectively, a reamer centrally disposed relatively to the head and the chasers and movable longitudinally of the axis of the head, and means for transferring the inward movement of said reamer onto the sleeve, to move the latter with the levers longitudinally over said inclined faces.

10. The combination with a head, chasers radially movable thereon, and a tapered member carried by each chaser, of a series of levers engaging said tapered members for controlling the outward movement of the chasers to a certain ratio relative to the advance movement of the work through the chasers during the cutting operation, a member pivotally connected with and for moving all of said devices over said tapered members in unison with and by such advance movement of the work, and resilient means tending to open said chasers.

11. The combination with a head, a series of chasers carried thereby and mounted for radial movement thereon, and a member for each chaser and having an inclined working face and an abrupt drop-off face, of levers adapted to travel over said working faces during the cutting operation, means for moving said levers longitudinally in unison with the work, and means for variably controlling the initial point of engagement of said levers with said working faces longitudinally thereof.

12. The combination with a head, a series of chasers carried thereby and mounted for radial movement thereon, and a member for each chaser and having an inclined working face and an abrupt drop-off face, of levers adapted to travel over said working faces during the cutting operation, means for moving said levers longitudinally in unison with the work, and means for limiting the forward movement of said levers.

13. The combination with a head, a series of chasers carried thereby and mounted for radial movement thereon, and a member for each chaser and having an inclined working face and an abrupt drop-off face, of levers adapted to travel over said working faces during the cutting operation, means for moving said levers longitudinally in unison with the work, said means comprising a sleeve, and means carried by said sleeve to limit the forward movement thereof.

14. The combination with a head, a series of chasers carried thereby and mounted for radial movement thereon, and a member for each chaser and having an inclined working face and an abrupt drop-off face, of levers adapted to travel over said working faces during the cutting operation, means for moving said levers longitudinally in unison with the work, said means comprising a sleeve, and an adjusting screw carried by said sleeve and adapted to engage the rear face of said head for limiting the forward movement of said sleeve.

In testimony whereof I affix my signature in presence of two witnesses.

WILLIAM MURCHEY.

Witnesses:
  H. D. MacDonald,
  Chas. F. Schmelz.